(12) United States Patent
Claussen et al.

(10) Patent No.: US 8,179,854 B2
(45) Date of Patent: May 15, 2012

(54) ALLOCATING BASE STATIONS TO LOCATION AREAS IN CELLULAR TELECOMMUNICATIONS NETWORKS

(75) Inventors: Holger Claussen, Swindon (GB); Lester Tse Wee Ho, Swindon (GB)

(73) Assignee: Alcatel Lucent, Paris (FR)

( * ) Notice: Subject to any disclaimer, the term of this patent is extended or adjusted under 35 U.S.C. 154(b) by 445 days.

(21) Appl. No.: 12/464,321

(22) Filed: May 12, 2009

(65) Prior Publication Data

US 2009/0285171 A1 Nov. 19, 2009

(30) Foreign Application Priority Data

May 14, 2008 (EP) .................................. 08008938

(51) Int. Cl.
*H04W 4/00* (2009.01)
(52) U.S. Cl. .................. 370/329; 370/310; 370/328
(58) Field of Classification Search .................. None
See application file for complete search history.

(56) References Cited

U.S. PATENT DOCUMENTS

| | | | |
|---|---|---|---|
| 2001/0034232 A1 | 10/2001 | Kuwahara | |
| 2002/0187793 A1 | 12/2002 | Papadimitriou et al. | |
| 2003/0109254 A1* | 6/2003 | Motegi et al. | 455/435 |
| 2005/0059404 A1* | 3/2005 | Bejerano et al. | 455/446 |
| 2008/0076419 A1* | 3/2008 | Khetawat et al. | 455/435.1 |

FOREIGN PATENT DOCUMENTS

EP 1 351 530 A1 10/2003

OTHER PUBLICATIONS

Hang-Wen Hwang et al., "A Direction-Based Location Update Scheme with a Line-Paging Strategy for PCS Networks," IEEE Communications Letters, IEEE Service Center, Piscataway, NJ, US, vol. 4, No. 5, XP011083876, pp. 149-151, May 1, 2000.
Wha Sook Jeon et al., "Performance of Improved Probabilistic Location Update Scheme for Cellular Mobile Networks," IEEE Transactions on Vehicular Technology, IEEE Service Center, Piscataway, NJ, US, vol. 49, No. 6, XP011064162, pp. 2164-21731 Nov. 2000.
Saha et al., "Time efficient heuristic for cell-to-switch assignment in quasi-static/dynamic location area planning of mobile cellular networks," Computer Communications, Elsevier Science Publishers B.V., vol. 30., No. 2, pp. 326-340, XP005808358, Dec. 19, 2006.
Mandal et al., "Heuristic Search Techniques for Cell to Switch Assignment in Location Area Planning for Cellular Networks," IEEE Communications Society, vol. 7, pp. 4307-4311, XP010711942, Jun. 20, 2004.

(Continued)

*Primary Examiner* — Hassan Phillips
*Assistant Examiner* — Gautam Sharma
(74) *Attorney, Agent, or Firm* — Fay Sharpe LLP

(57) ABSTRACT

A method is provided of allocating a location area identifier to a cellular base station for wireless communications. The method comprises the following steps. Information is received of geographic location of a base station. For each of a plurality of location areas, each having a location area center, a function is calculated that is dependent upon distance of the base station from location area centers. The location area giving the lowest function value is selected as the location area for the base station.

10 Claims, 2 Drawing Sheets

OTHER PUBLICATIONS

Nokia Siemens Networks, Nokia, "Short Notes on Small Nodes," 3GPP TSG-RAN WG3 Meeting #59bis, R3-080905, XP002500881, pp. 1-4, Shenzhen, China, Mar. 31, 2008-Apr. 3, 2008.

Mitsubishi Electric, "Whereability of HNBs," 3GPP TSG SA WG5 and RAN WG3 LTE Adhoc, R3-071237, XP002500880, pp. 1-4, Sophia-Antipolis, France, Jun. 13, 2007-Jun. 14, 2007.

European Search Report.

Koteswararao Kondepu et al., "Partially Overlapping Super Location Area (POSLA): An Efficient Scheme for Location Management in PCS Networks," Vehicular Technology Conference, XP031255951, pp. 2182-2187, May 11, 2008.

International Search Report.

* cited by examiner

ALLOCATING BASE STATIONS TO LOCATION AREAS IN CELLULAR TELECOMMUNICATIONS NETWORKS

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the term picocells generically for cells that are smaller than macrocells. One way to establish a picocell is to provide a picocell base station that operates within a relatively limited range within the coverage area of a macrocell. One example of use of a picocell base station is to provide wireless communication coverage within a building.

The picocell base station is of a relatively low transmit power and hence each picocell is small compared to a macrocell.

Picocell base stations can use broadband Internet Protocol connections as "backhaul", in other words they are connected via picocell base station gateways to, for example, a Universal Mobile Telecommunications System (UMTS) core network, for example each gateway may be connected to a UMTS Mobile Switching Centre (MSC) and hence a Signalling Gateway Support Node (SGSN). Picocell base stations are intended primarily for users belonging to a particular home or office. Picocell base stations may be private access or public access. In private access picocell base stations, access is restricted only to registered users, for example family members or particular groups of employees. In public access picocell base stations, other users may also use the picocell base station, subject to certain restrictions to protect the Quality of Service received by registered users.

There can be a large number of picocells within an area roughly equivalent to the size of a macrocell. Accordingly, there can be a large number of picocells in an operator's coverage area, such that conventional cell planning, as done to optimise location of base stations in macrocell networks, becomes impractical. This is particularly so as picocells are usually deployed by end-users or unskilled individuals installing picocell base stations where they choose in their offices and homes, for example in what is sometimes called a "plug-and-play" manner.

Another area of background is the use of area codes.

During configuration of a cellular network (e.g. Universal Mobile Telecommunications System (UMTS), CDMA2000, Long Term Evolution (LTE)), various types of area codes are assigned to each cell so as to be used in handover procedures and in the provision of location based services. These codes are, of course, identifiers of the relevant areas. Examples include location area codes, routing area codes, and service area codes.

The overall area of coverage consists of location areas. Base stations within any one location area use the same location area code. Location area codes are used to identify in which location area a user terminal currently resides so that a paging signal can be sent from the base stations in that location area only.

The user terminal keeps the network informed of which location area the user terminal is currently camped on. Also, the user terminal performs a location update procedure when the user terminal enters a new location area. When there is a call incoming to the user terminal to be set up, only base stations that are within the user terminal's last known location area are instructed to send out paging messages, to page for that user terminal. Location area codes are also used to provide location-based services, and during emergency calls to identify where the user is. Routing areas are similar to location areas but for data calls rather than voice calls. Basically, one or more routing area is contained within a location area.

As regards location area size, on the one hand, large location areas are preferable in order to minimise the number of location area updates that are required. On the other hand, as location area size increases, the amount of paging signalling increases. In consequence, good location area size is a tradeoff.

Currently area codes, such as location area codes, are allocated to base stations by a human operator.

SUMMARY OF THE INVENTION

The reader is referred to the appended independent claims. Some preferred features are laid out in the dependent claims.

An example of the present invention is a method of allocating a location area identifier to a cellular base station for wireless communications. The method comprises the following steps. Information is received of geographic location of a base station. For each of a plurality of location areas, each having a location area centre, a function is calculated that is dependent upon distance of the base station from location area centres. The location area giving the lowest function value is selected as the location area for the base station.

The inventor realised that the manual allocation of area codes, although feasible for macro-cellular networks, was unsuitable for networks including picocell base stations.

The inventor realised that manual assignment of area codes becomes problematic for networks including picocell base stations as area codes need to be assigned to tens of thousands, hundreds of thousands or more, picocell base stations. Also, the inventor realised that the number of picocell base stations is likely to increase over time as market penetration increases, requiring constant reallocation of area codes to picocell base stations.

The automated approach to area code allocation used in preferred embodiments makes picocell deployments more practical.

In preferred embodiments, each location area is given a centre and picocell base stations are allocated to a location area (identified by a location area code) based on its distance from location area centres and a range modifier in an iterative process. In each iteration, picocell base station allocations are updated until a converged solution is reached that satisfies the operator's requirements.

In preferred embodiments, each picocell base station is allocated the location area that best minimises a cost function dependent upon distance to the location area centre and a range modifier. Each location area has a range modifier adapted to achieve a roughly equal number of associated picocell base stations per location area.

Preferred embodiments advantageously provide automatic allocation of area codes, such as location area code. This is useful in view of the plug- and play nature of picocell base station deployment. The approach can provide a quickly converging yet adaptive area code allocation solution despite large numbers of picocell base stations and the unplanned, organic, often changing configuration in which they are deployed. There can be hundreds of thousands of picocell base stations in a network. Preferred embodiments advantageously provide low computational complexity per code assignment.

Some preferred embodiments relate to networks including picocell base stations having public access.

The approach is also usable in networks consisting of, for example, mainly or only macrocells.

BRIEF DESCRIPTION OF THE DRAWINGS

An embodiment of the present invention will now be described by way of example and with reference to the drawings, in which.

DETAILED DESCRIPTION

Figure 1:
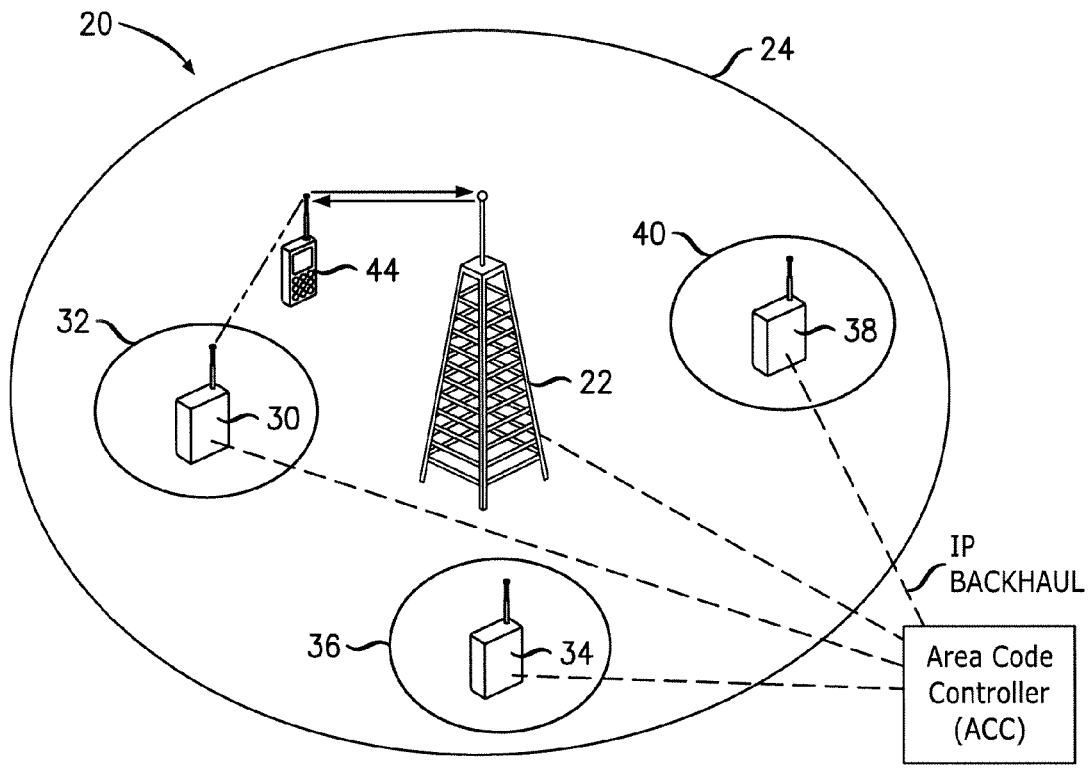
FIG. 1 is a diagram illustrating a wireless communications network according to a first embodiment of the present invention.

As shown in FIG. 1, in one communication network 20, there are two types of base stations (often denoted BS or BSs) macrocell base stations and picocell base stations. One macrocell base station 22 for wireless telecommunications is shown for simplicity in FIG. 1. The macrocell base station has a radio coverage area 24 that is often referred to as a macrocell. The geographic extent of the macrocell 24 depends on the capabilities of the macrocell base station 22 and the surrounding geography.

Within the macrocell 24, a picocell base station unit (PCBSU) 30 provides wireless communications within a picocell 32. A picocell is a radio coverage area. The radio coverage area of the picocell 30 is much less than that of the macrocell 24. For example, the picocell 32 corresponds in size to a user's home.

Another picocell base station unit (PCBSU) 34 provides wireless coverage within a picocell 36. A further picocell 38 provides wireless coverage within a picocell 40.

It is possible for a mobile terminal 44 within the macrocell 24 to communicate with the macrocell base station 22 in known manner. When the mobile terminal 44 enters into a picocell 32 for which the mobile terminal has access to the picocell base station 30, it is desirable to handover the connection with the mobile terminal from the macrocell to the picocell. In the example shown in FIG. 1, the user of mobile terminal 44 is a preferred user to use the picocell 32.

The PCBSUs 30, 34, 38 and macrocell base station 22 are connected via broadband Internet Protocol connections ("backhaul") to an area code controller (ACC) of a UMTS core network.

Figure 2:
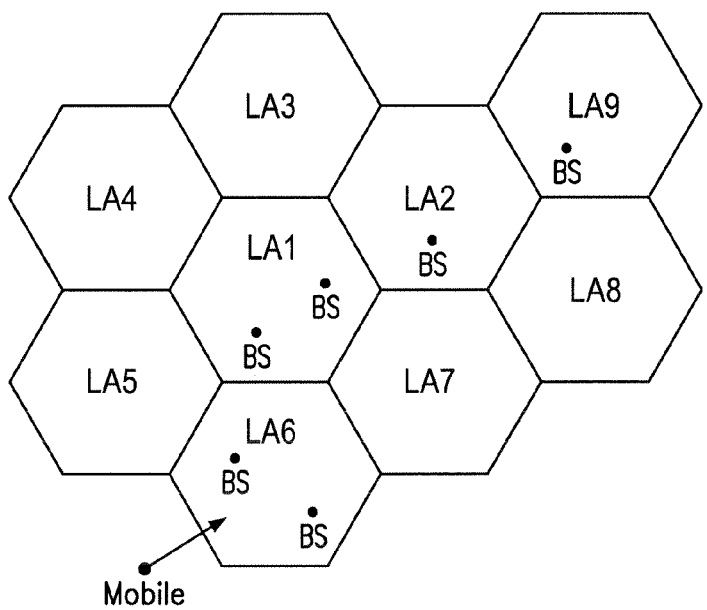
FIG. 2 is a diagram illustrating the coverage area of the network shown in FIG. 1 made up of location areas.

As shown in FIG. 2, in this example the coverage area is divided into, say, nine location areas LA1 to LA9. and the base stations within any one location area use the same location area code. The base stations are typically a mixture of some macrocellular base stations and a greater number picocell base stations.

Location area codes are used to identify in which location area a user terminal currently resides so that a paging signal can be sent from the base station in that location area only.

The user terminal keeps the network informed of which location area the user terminal is currently camped on. Also, the user terminal (for example "mobile" as shown in FIG. 2) performs a location update procedure when the user terminal enters a new location area. When there is a call incoming to the user terminal to be set up, only base stations that are within the user terminal's last known location area are instructed to send out paging messages, to page for that user terminal.

Location area codes are also used to provide location based services and during emergency calls. Routing areas are similar to location areas but for data calls rather than voice calls. One or more routing areas need to be contained within a location area.

Location Area Allocation Method

This in an iterative process consists of selecting initial parameter values, then running the calculations to determine a first result for allocation of location area identifying codes to base stations, then repeatedly modifying parameter values and recalculating until an acceptably converged solution results.

Selecting Initial Parameter Values

First a decision is taken as to the number of location areas that will be provided in the coverage area, in other words how many different location area codes will be provided.

Next a geographic centre, defined by longitude and latitude coordinates of a map, is selected for each of the location areas. In this example, this is done in a pseudo-random manner within the coverage area of interest as little or no useful information on the distribution of picocell base stations is available. (In an otherwise similar alternative embodiment, not shown, the centres are instead allocated according to the expected base station distribution).

Next a range modifier, that will be explained in more detail below, for each location area is initialised as zero. The range modifier is referred to as delta or delta(c) in this discussion.

The Process

The process is iterative. It is undertaken for each new base station that is deployed.

The steps are explained in more detail below, but basically speaking, each base station is allocated the location area code $c_{allocated}$ with the smallest cost function:

$$c_{allocated} = \arg\min_c (\log_{10}(d(c)) + \text{delta}(c))$$

where d(c) is the distance between the base station and the centre of the location area having location area code c, and delta(c) is a range modifier for the area code c.

Figure 3:
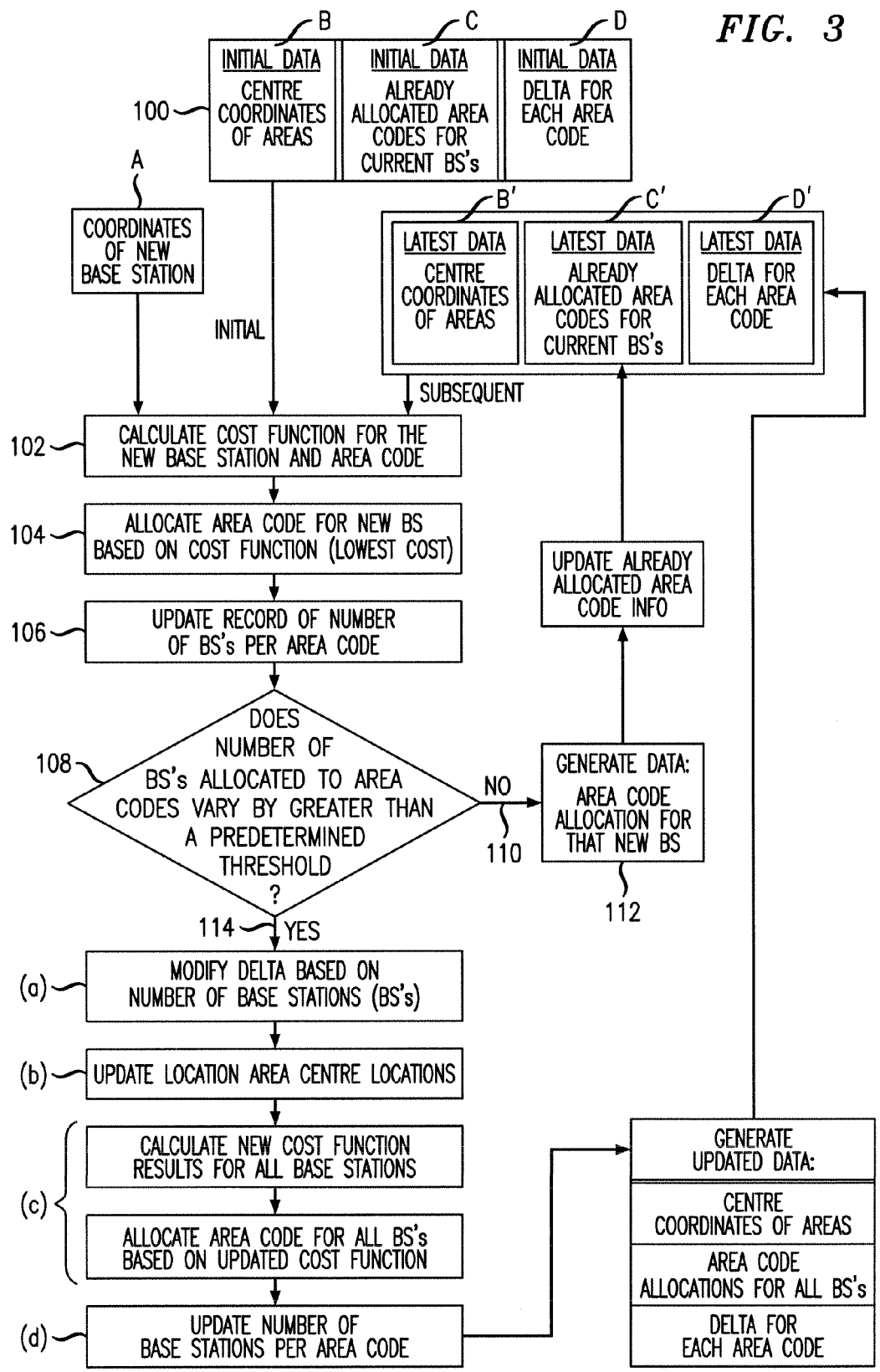
FIG. 3 is a diagram illustrating a method of identifying the location area for each picocell base station in the network shown in FIG. 1.

As shown in FIG. 3, initial parameter values are selected (step 100)

For each base station, the cost function $cost_c = \log_{10}(d(c)) + \text{delta}(c)$ is determined (step 102) for various different location area codes identified by there respective code c. Of these, the area code associated with the lowest cost function is allocated (step 104) to the base station.

For each area code, the number of base stations that have been allocated that area code is determined (step 106).

Next a query is made (step 108) as to whether the number of base stations allocated to different area codes differs by greater than a predetermined threshold. This threshold, is, for example, that there is a greater than 20% variation.

If No (step 110), the area code allocation to that base station is accepted and output (step 112) and used to update stored data of the already allocated area codes to the current base stations.

On the other hand, if Yes (step 114) then steps are taken, as explained in more detail below, to:

adjust (step a) the range modifier delta(c) to achieve an acceptably similar number of base stations allocated to each location area code;

adjust (step b) the centre locations of location areas; then update (step c) the "best" location area code for each base station (this involves, for each base station, recalculating the modified cost functions and selecting the location area giving the lowest); and update (step d) the number of base stations per area code.

Adjusting the Range Modifier (FIG. 3: Step a)

As regards the use of the range modifier, delta(c), this range modifier is required to change the size of each location area so as to seek to keep the number of base stations within acceptable limits. For example if the base station distribution is non-uniform.

If there are many base stations within one area, then delta (c) is increased in order to make the associated cost higher, and so less attractive. On the other hand, if there are few base stations within an area, delta(c) is reduced so as to reduce the cost, making it more likely that base stations are allocated to that location area.

Modifying Area Centres (FIG. 3: Step b)

This step is done by calculating the point that minimises total distance to all base stations currently allocated to a location area and taking the coordinates of that point as the replacement centre.

Updating Area Allocations (FIG. 3: Step c)

For all base stations, the allocation of location areas is updated by, for each base station, recalculating the cost function using the new location area centres and deltas and selecting the location area giving the lowest cost.

These steps of adjusting the range modifier (step a), modifying area centres (step b) and updating area allocations (step c) are most likely to occur in the early stages of a network deployment. Effectively, with even a low number of users the user distribution is quickly adapted to so that area codes are quickly optimised. This may be important in some circumstances because although the allocation to a new base station is relatively simple, the computational complexity of each optimisation that involves adjustments of location area centres and range modifiers depends on the total number of base stations, so can get large. Accordingly, this fast convergence ensures low overall computational complexity.

Adjustments of location area centres and range modifiers in a late stage of deployment, when many base station have already been allocated area codes, could result in many base stations being reallocated codes. The quick convergence of the process means that only a few such reallocation stages are typically required.

Some Variants/Alternatives

This approach is usable in networks which are macrocellular, not just in networks including one or more picocell base station. The approach is usable in various cellular networks, e.g macro-, micro-, pico-, that use the location area concept, e.g. Global System for Mobiles, CDMA2000, Universal Mobile Telecommunications System (UMTS) Long Term Evolution and others).

In some otherwise similar embodiments, the number of area code re-allocations applied to base stations that have already been allocated area codes can be reduced by modifying the updating code allocations (step c) such that an area code is only altered if the cost function for the "new" area for a base station is lower than the cost function for the current area by more than a predetermined amount.

In some otherwise similar embodiments, the computational complexity for optimisation is reduced by only triggering optimising iterations (steps a to d) when both the number of allocated base stations per area code varies by more than a predetermined amount (e.g 10), and the fractional variation in the number of allocated base stations per area code exceeds a predetermined percentage (say 20%). In some embodiments, the number of iterations that can be performed when new base stations are deployed can be limited. For example a maximum number of iterations can be set to be the higher of ten or the number of new base stations deployed at that stage (this can be expressed mathematically as $I_{max}$=max (10, new base stations).

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of allocating a location area identifier to a cellular base station for wireless communications, the method comprising:

receiving information of geographic location of a base station;

for each of a plurality of location areas, each having a location area centre, an area allocation controller calculating a distance, d, of the base station from the respective location area centre and calculating a function having said distance as an input, the function also having as an input a range modifying parameter, delta, each location area having an associated range modifying parameter value, the function being a function of the distance, d, and the range modifying parameter, delta;

the method further comprising for a location area adjusting the associated range modifying parameter so as to adjust the number of base stations to be allocated to the location area, and recalculating the function for each of a plurality of location areas;

selecting the location area giving the lowest recalculated function value as the location area for the base station, and allocating that location area to the base station.

2. A method according to claim 1, further comprising: adjusting a location area centre.

3. A method according to claim 2, in which the location area centre is adjusted by determining the point that minimises total distance of all base stations allocated to a location area, and taking that point as the adjusted location area centre.

4. A method according to claim 1, further comprising recording the number of base stations allocated to a location area, determining whether the distribution of number of base stations allocated to location areas is within predetermined limits, and if not adjusting at least one of a range modifying parameter of a location area and a location area centre, and conducting base station to location area reallocation.

5. A method according to claim 1 in which at least one of the base stations is a picocell base station.

6. A method according to claim 1 which is automatic.

7. The method according to claim 1, in which the function is a function of the sum of the distance, d, and range modifying parameter, delta.

8. A cellular wireless telecommunications network comprising base stations operative to page user terminals within a location area associated with the user terminal, and a location area allocation controller;

the controller being configured to select and allocate base stations to a location area, in which:

the controller is configured to receive information of geographic location of a base station;

the controller is configured to, for each of a plurality of location areas, each having a location area centre, calculate a distance, d, of the base station from the respective location area centre and calculate a function having said distance as an input, the function also having as an input a range modifying parameter, delta, each location area having an associated range modifying parameter value, the function being a function of the distance, d, and the range modifying parameter, delta;

the controller is configured to, for a location area, adjusted the associated range modifying parameter so as to adjust the number of base stations to be allocated to the location area;

in which the controller is configured, for each of a plurality of base stations, to recalculate the function for each of the plurality of location areas, to select the location area giving the lowest recalculated function value as the location area for the respective base station, and to allocate that location area to the base station.

9. A wireless telecommunications network according to claim 8, in which the controller is further configured to adjust the centre of a location area by determining the point that minimises total distance of all base stations allocated to a location area, and taking that point as the adjusted location area centre.

10. The method according to claim 7, in which the function is $\log_{10}(d+\text{delta})$.

* * * * *